United States Patent
Nikaido et al.

(10) Patent No.: US 10,215,470 B2
(45) Date of Patent: Feb. 26, 2019

(54) HEAT PUMP SYSTEM AND OPERATION METHOD THEREFOR

(71) Applicant: MITSUBISHI HEAVY INDUSTRIES THERMAL SYSTEMS, LTD., Tokyo (JP)

(72) Inventors: Satoshi Nikaido, Tokyo (JP); Takeshi Fuchimoto, Tokyo (JP); Minoru Matsuo, Tokyo (JP); Toshiaki Ouchi, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 175 days.

(21) Appl. No.: 15/102,023

(22) PCT Filed: Dec. 11, 2014

(86) PCT No.: PCT/JP2014/082849
§ 371 (c)(1),
(2) Date: Jun. 6, 2016

(87) PCT Pub. No.: WO2015/129128
PCT Pub. Date: Sep. 3, 2015

(65) Prior Publication Data
US 2016/0305702 A1    Oct. 20, 2016

(30) Foreign Application Priority Data

Feb. 25, 2014 (JP) .................................. 2014-034150

(51) Int. Cl.
*F25D 21/00* (2006.01)
*F25B 49/02* (2006.01)
(Continued)

(52) U.S. Cl.
CPC ............ *F25D 21/006* (2013.01); *F25B 13/00* (2013.01); *F25B 25/005* (2013.01); *F25B 49/02* (2013.01);
(Continued)

(58) Field of Classification Search
CPC ........ F25B 13/00; F25B 47/02; F25B 47/025; F25B 3400/06; F25B 3400/075;
(Continued)

(56) References Cited

U.S. PATENT DOCUMENTS

| 6,874,693 B2* | 4/2005 | Readio ................... F24D 12/02 237/2 A |
| 2012/0174609 A1 | 7/2012 | Matsuo et al. |
| 2016/0161165 A1* | 6/2016 | Ushijima .............. F25B 49/022 62/155 |

FOREIGN PATENT DOCUMENTS

| JP | 62-17572 A | 1/1987 |
| JP | 1-273947 A | 11/1989 |

(Continued)

OTHER PUBLICATIONS

International Search Report, issued in PCT/JP2014/082849, PCT/ISA/210, dated Mar. 3, 2015.
(Continued)

*Primary Examiner* — Marc E Norman
(74) *Attorney, Agent, or Firm* — Birch, Stewart, Kolasch & Birch, LLP

(57) ABSTRACT

Provided is a heat pump system that can appropriately manage the number of heat pumps in operation even when any of the heat pumps is defrosting, and that can always operate at a capacity that corresponds to a load. Also provided is an operation method for the heat pump system. A heat pump system (1) wherein a plurality of heat pumps (10A-10C (13A-13D)) are connected to a system load and
(Continued)

wherein a system management unit (27) successively calculates the capacity that can be output by the heat pumps (10A-10C (13A-13D)) in operation, compares the calculated capacity value, as a threshold value, to the thermal load of the system load, and manages the number of heat pumps (10A-10C (13A-13D)) in operation.

9 Claims, 4 Drawing Sheets

(51) Int. Cl.
  *F25B 13/00* (2006.01)
  *F25B 25/00* (2006.01)
  *F25B 47/02* (2006.01)
(52) U.S. Cl.
  CPC .......... *F25B 47/025* (2013.01); *F25B 2400/06* (2013.01); *F25B 2400/075* (2013.01); *F25B 2600/021* (2013.01); *F25B 2700/21172* (2013.01); *F25B 2700/21173* (2013.01); *Y02B 30/741* (2013.01)
(58) Field of Classification Search
  CPC ............ F25B 2400/06; F25B 2400/075; F25D 21/002; F25D 21/006

USPC .................................. 62/151, 175, 277, 278
See application file for complete search history.

(56) References Cited

FOREIGN PATENT DOCUMENTS

| JP | 3-168554 A | 7/1991 |
|----|------------|--------|
| JP | 6-74531 A | 3/1994 |
| JP | 3221232 B2 | 10/2001 |
| JP | 2004-278884 A | 10/2004 |
| JP | 2009-127936 A | 6/2009 |
| JP | 2011-106699 A | 6/2011 |
| JP | 2012127633 A * | 7/2012 |
| JP | 2013-108732 A | 6/2013 |
| JP | 2013-181673 A | 9/2013 |
| JP | 2013-228130 A | 11/2013 |

OTHER PUBLICATIONS

Written Opinion of the International Searching Authority, issued in PCT/JP2014/082849, PCT/ISA/237, dated Mar. 3, 2015.

* cited by examiner

HEAT PUMP SYSTEM AND OPERATION METHOD THEREFOR

TECHNICAL FIELD

The present invention relates to a heat pump system in which plural heat pumps are connected with respect to a system load and an operation method therefor.

BACKGROUND ART

In an air-cooling heat pump chiller, a heat exchanger on a heat source side becomes frosted in a heating operation under a condition that an external temperature is low. Further, if the frosting progresses, it hinders heat exchange which leads to deterioration of its efficiency. Accordingly, a defrost operation for removing frost is necessary. In this case, in the heat pump chiller, a water heat exchanger on a user side functions as an evaporator to take heat, and there is a problem in that a temperature when heat is supplied to the load is reduced.

Thus, in a system in which plural heat pumps are connected with respect to a load, when a specific heat pump becomes frosted and starts a defrost operation, a technique of forcibly operating a stopped heat pump or operating a preliminary heat pump which is under an abnormal operation to back up a decreased capacity is disclosed in PTL 1 and PTL 2. Further, PTL 3 discloses a technique of preventing two or more heat pumps among plural heat pumps which are connected with respect to a load from starting a defrost operation in the same period of time.

Meanwhile, in recent years, a heat pump has been modularized in a unit. For example, a heat pump system in which an individual air-cooling heat pump chiller is modularized, plural modules are connected in series to form a unit, and plural units are connected in parallel with respect to an external load (system load) has been practically used.

CITATION LIST

Patent Literature

[PTL 1] Japanese Unexamined Patent Application Publication No. 6-74531
[PTL 2] Japanese Patent No. 3221232
[PTL 3] Japanese Unexamined Patent Application Publication No. 2013-108732

SUMMARY OF INVENTION

Technical Problem

However, in a heat pump system in which plural heat pumps are connected with respect to a load, even if a specific heat pump is under a defrost operation, in a case where there is a heat pump capable of showing a heating capacity among the plural heat pumps, it is not necessary to directly perform an additional operation of a preliminary heat pump or a stopped heat pump corresponding to the heat pump which is under the defrost operation. Further, as disclosed in PTL 1 and PTL 2, when a specific heat pump starts a defrost operation, if a preliminary heat pump or a stopped heat pump is additionally operated corresponding thereto, this may lead to a wasteful operation of the preliminary heat pump or the stopped heat pump, and may go against the trend of energy saving, for example.

Further, in the heat pump which is under the defrost operation, since a user side heat exchanger functions as an evaporator to take heat, if an additional operation of a preliminary heat pump or a stopped heat pump is merely performed corresponding to the number of heat pumps which are in the defrost operation, a capacity shortage may occur with respect to a thermal load of a system load, for example.

In order to solve the above problems, an object of the invention is to provide a heat pump system in which plural heat pumps are connected with respect to a system load, which is capable of appropriately controlling, even when a specific heat pump is under a defrost operation, the number of heat pumps which are in operation and which is capable of being constantly operated with a capacity corresponding to the load, and an operation method therefor.

Solution to Problem

In order to solve the above problems, the heat pump system and the operation method therefor according to the invention employ the following means.

According to a first aspect of the invention, there is provided a heat pump system in which a plurality of heat pumps is connected with respect to a system load, including: a system controller that successively calculates a capacity capable of being output by a heat pump which is in operation among the heat pumps, compares a value of the calculated capacity which serves as a threshold value with a thermal load of the system load, and controls the number of heat pumps which are in operation among the heat pumps.

According to the first aspect of the invention, the heat pump system in which the plurality of heat pumps is connected with respect to the system load includes the system controller that successively calculates the capacity capable of being output by the heat pump which is in operation among the heat pumps, compares the value of the calculated capacity which serves as the threshold value with the thermal load of the system load, and controls the number of heat pumps which are in operation among the heat pumps. Thus, even if a specific heat pump among the heat pumps which are in operation starts a defrost operation, by comparing the value of the calculated capacity which serves as the threshold value, capable of being output by the heat pumps which are in operation at that time, with the thermal load of the system load and controlling the number of heat pumps which are in operation, it is possible to operate the heat pump system with a capacity capable of corresponding to the thermal load of the system load, without directly performing, when there is a heat pump capable of showing a heating capacity among the heat pumps which are in operation, an additional operation of another heat pump. Accordingly, even when a specific heat pump is under a defrost operation, it is not necessary to perform an additional operation of another heat pump according to conditions, and it is possible to operate the heat pump system with high efficiency using a minimum number of heat pumps, to thereby achieve energy saving. Further, it is possible to reduce the frequency of turning on and off of the heat pump, and thus, it is possible to prevent failure or problems due to frequent repetition of turning on and off, to thereby enhance reliability of the heat pump system.

Further, according to the first aspect of the invention, in the above-described heat pump system, a capacity capable of being output by each heat pump may be calculated by either of each heat pump controller or the system controller.

With such a configuration, the capacity capable of being output by each heat pump may be calculated by either of each heat pump controller or the system controller. Thus, even in a case where each heat pump controller does not have a capacity calculation function, it is possible to additionally provide a capacity calculation function to the system controller, and thus, even when a specific heat pump is under a defrost operation as described above, it is not necessary to perform an additional operation of a preliminary heat pump according to conditions, and it is possible to operate the heat pump system with high efficiency using a minimum number of heat pumps. Accordingly, it is possible to simply apply the invention to an existing heat pump system.

Further, according to the first aspect of the invention, in the above-described heat pump system, the system controller may be configured to calculate, when a specific heat pump among the respective heat pumps starts or terminates a defrost operation, the capacity capable of being output by each heat pump so that the capacity is increased or decreased by a capacity of the specific heat pump.

With such a configuration, the system controller is configured to calculate, when the specific heat pump among the respective heat pumps starts or terminates the defrost operation, the capacity capable of being output by each heat pump so that the capacity is increased or decreased by the capacity of the specific heat pump. Thus, even though the capacity capable of being output is increased or decreased as each heat pump starts or terminates the defrost operation, it is possible to regularly calculate the capacity capable sof being output with accuracy in consideration of the increase or decrease. Accordingly, it is possible to correctly set the number of heat pumps which are to be operated with respect to the thermal load of the system load for operation, regardless of the presence or absence of a defrost operation in each heat pump, and thus, it is possible to reliably prevent a capacity shortage or the like.

Further, in the heat pump system having the above-described configuration, the system controller may be configured to calculate the capacity capable of being output by each heat pump by considering heat taken by the specific heat pump which is under the defrost operation as a negative capacity.

With such a configuration, the system controller is configured to calculate the capacity capable of being output by each heat pump by considering heat taken by the specific heat pump which is under the defrost operation as a negative capacity. Thus, by decreasing the capacity capable of being output by each heat pump by a capacity of the heat pump which is under the defrost operation, and further, by calculating the capacity capable of being output by each heat pump by considering, as a negative capacity, heat taken when a user side heat exchanger of the heat pump which is under the defrost operation functions as an evaporator, it is possible to calculate the capacity capable of being output with high accuracy. Accordingly, it is possible to correctly set the number of heat pumps which are to be operated with respect to the thermal load of the system load for operation, and thus, it is possible to reliably prevent a capacity shortage or the like.

Further, according to the first aspect of the invention, in the above-described heat pump system, the system controller may be configured to calculate, when a specific heat pump among the respective heat pumps starts a defrost operation, the capacity capable of being output by the heat pump which is in operation through multiplication by a predetermined allowance rate.

With such a configuration, the system controller is configured to calculate, when the specific heat pump among the respective heat pumps starts the defrost operation, the capacity capable of being output by the heat pump which is in operation through multiplication by the predetermined allowance rate. Thus, in a case where it is considered that as a specific heat pump starts a defrost operation and another heat pump becomes also frosted and is operating in a state in which it readily undergoes a defrost operation, it is possible to prevent frosting by calculating the capacity capable of being output through multiplication by the predetermined allowance rate so that a thermal load is not applied to the heat pump, and to prevent another heat pump from also starting a defrost operation. Accordingly, it is possible to reduce the frequency at which each heat pump starts a defrost operation, or to delay a timing when each heat pump starts the defrost operation, to thereby enhance the efficiency in the heating operation.

Further, in the heat pump system having the above-described configuration, the system controller may be configured to release, with respect to the specific heat pump in which the defrost operation is terminated, the multiplication by the allowance rate with respect to the capacity capable of being output for a set time from the time when the defrost operation is terminated.

With such a configuration, the system controller is configured to release, with respect to the specific heat pump in which the defrost operation is terminated, the multiplication by the allowance rate with respect to the capacity capable of being output for a set time from the time when the defrost operation is terminated. Thus, when calculating the capacity capable of being output, in a case where there is a heat pump of which a defrost operation is immediately terminated, it is considered that the heat pump does not become frosted, and thus, it is determined that it is not necessary to perform the multiplication by the allowance rate. Thus, it is possible to release the multiplication by the allowance rate for the set time from the time when the defrost operation is terminated, and thus, it is possible to calculate a capacity capable of being output which is closer to an actual capacity. Accordingly, it is possible to calculate the capacity capable of being output with high accuracy, and thus, it is possible to correctly set the number of heat pumps which are to be operated with respect to the thermal load of the system load for operation.

Further, in the heat pump system having the above-described configuration, the system controller may be configured to perform the multiplication while gradually decreasing the allowance rate when a period of time during which each heat pump continues a heating operation becomes longer.

With such a configuration, the system controller is configured to perform the multiplication while gradually decreasing the allowance rate when the period of time during which each heat pump continues the heating operation becomes longer. In a case where a heat pump easily becomes frosted when a period of time during which a heating operation thereof continues becomes longer, another heat pump may also easily starts a defrost operation. In this case, by calculating the capacity capable of being output through multiplication by the allowance rate which is gradually decreased according to the period of time during which the operation continues, and by preventing frosting so that a thermal load is not applied to the heat pump, it is possible to prevent another heat pump from starting a defrost operation. Accordingly, it is possible to reduce the frequency at which each heat pump starts a defrost operation, or to delay a timing when each heat pump starts the defrost operation, to thereby enhance the efficiency in the heating operation.

Further, in the heat pump system having the above-described configuration, the system controller may be configured to count the number of defrost operations of the heat pump which is in operation and to perform the multiplication while gradually reducing the allowance rate as the number of defrost operations becomes larger.

With such a configuration, the system controller is configured to count the number of defrost operations of the heat pump which is in operation and to perform the multiplication while gradually reducing the allowance rate as the number of defrost operations becomes larger. In a case where frost partially remains without being removed even if a heat pump has performed a defrost operation, the heat pump may start the defrost operation again in a short time, so that the number of defrost operations may be increased. In this case, by counting the number of defrost operations of the heat pump which is in operation and performing the multiplication while gradually reducing the allowance rate according to the number of defrost operations, it is possible to prevent frosting so that a thermal load is not applied to the heat pump, and to prevent the heat pump from starting a defrost operation. Accordingly, it is possible to reduce the frequency at which each heat pump starts a defrost operation, or to delay a timing when each heat pump starts the defrost operation, to thereby enhance the efficiency in the heating operation.

According to a second aspect of the invention, there is provided an operation method of a heat pump system in which a plurality of heat pumps is connected with respect to a system load, including the steps of: successively calculating a capacity capable of being output by a heat pump which is in operation among the heat pumps; comparing a value of the calculated capacity which serves as a threshold value with a thermal load of the system load; and controlling increasing or decreasing the number of heat pumps which are in operation among the heat pumps according to whether the thermal load of the system load exceeds the threshold value which is the value of the calculated capacity.

According to the second aspect of the invention, the operation method of the heat pump system in which the plurality of heat pumps is connected with respect to the system load includes the steps of successively calculating the capacity capable of being output by the heat pump which is in operation among the heat pumps, comparing the value of the calculated capacity which serves as the threshold value with the thermal load of the system load, and controlling increasing or decreasing the number of heat pumps which are in operation among the heat pumps according to whether the thermal load of the system load exceeds the threshold value which is the value of the calculated capacity. Thus, even if a specific heat pump among the heat pumps which are in operation starts a defrost operation, by comparing the value of the calculated capacity which serves as the threshold value, capable of being output by the heat pumps which are in operation at that time, with the thermal load of the system load and increasing or decreasing the number of heat pumps which are in operation according to whether the thermal load of the system load is equal to or greater than the threshold value which is the value of the calculated capacity, it is possible to operate the heat pump system with a capacity capable of corresponding to the thermal load of the system load, without directly performing, when there is a heat pump capable of showing a heating capacity among the heat pumps which are in operation, an additional operation of another heat pump. Accordingly, even when a specific heat pump is under a defrost operation, it is not necessary to perform an additional operation of another heat pump according to conditions, and it is possible to operate the heat pump system with high efficiency using a minimum number of heat pumps, to thereby achieve energy saving. Further, it is possible to reduce the frequency of turning on and off of the heat pump, and thus, it is possible to prevent failure or problems due to frequent repetition of the turning on and off, to thereby enhance reliability of the heat pump system.

Further, according to the second aspect of the invention, in the above-described operation method of the heat pump system, increase or decrease in the number of heat pumps which are in operation may be determined according to whether the thermal load of the system load exceeds a value obtained by multiplying the threshold value which is the value of the calculated capacity by an increase load factor or a decrease load factor.

With such a configuration, the increase or decrease in the number of heat pumps which are in operation may be determined according to whether the thermal load of the system load exceeds the value obtained by multiplying the threshold value which is the value of the calculated capacity by the increase load factor or the decrease load factor. Thus, when increasing or decreasing the number of heat pumps which are in operation by comparing the threshold value which is the value of the calculated capacity with the thermal load, the value obtained by multiplying the threshold value which is the value of the calculated capacity by the increase load factor or the decrease load factor is compared with the thermal load, and it is determined whether the number of heat pumps which are in operation is to be increased or decreased, or to be maintained. Thus, it is possible to set a load factor range where a coefficient of performance (COP) of each heat pump is equal to or greater than a predetermined value in advance, and in a case where a load factor regulated in a relationship between the capacity of a heat pump and a demand thermal load exceeds an upper limit value (increase load factor) of the load factor range, it is possible to increase the number of heat pumps which are in operation. Further, in a case where the load factor exceeds a lower limit value (decrease load factor) of the load factor range, it is possible to decrease the number of heat pumps which are in operation. In this way, by increasing or decreasing the number of heat pumps which are in operation, it is possible to operate each heat pump at a COP which is constantly equal to or greater than the predetermined value, and accordingly, it is possible to constantly and stably operate the heat pump system with high efficiency at a high COP, regardless of a change in the number of heat pumps which are in operation.

Advantageous Effects of Invention

According to the heat pump system and the operation method therefor of the invention, even if a specific heat pump among the heat pumps which are in operation starts a defrost operation, by comparing the value of the calculated capacity which serves as the threshold value, capable of being output by the heat pumps which are in operation at that time, with the thermal load of the system load and controlling the number of heat pumps which are in operation, it is possible to operate the heat pump system with a capacity capable of corresponding to the thermal load of the system load, without directly performing, when there is a heat pump capable of showing a heating capacity among the heat pumps which are in operation, an additional operation of another heat pump. Accordingly, even when a specific heat pump is under a defrost operation, it is not necessary to perform an additional operation of another heat pump according to conditions, and it is possible to operate the heat pump system with high efficiency using a minimum number of heat pumps, to thereby achieve energy saving. Further, it is possible to reduce the frequency of turning on and off of the heat pump, and thus, it is possible to prevent failure or problems due to frequent repetition of the turning on and off, to thereby enhance reliability of the heat pump system.

DESCRIPTION OF EMBODIMENTS

Hereinafter, embodiments of the invention will be described with reference to the accompanying drawings.

First Embodiment

Hereinafter, a first embodiment of the invention will be described with reference to FIGS. 1 to 4.

Figure 1:
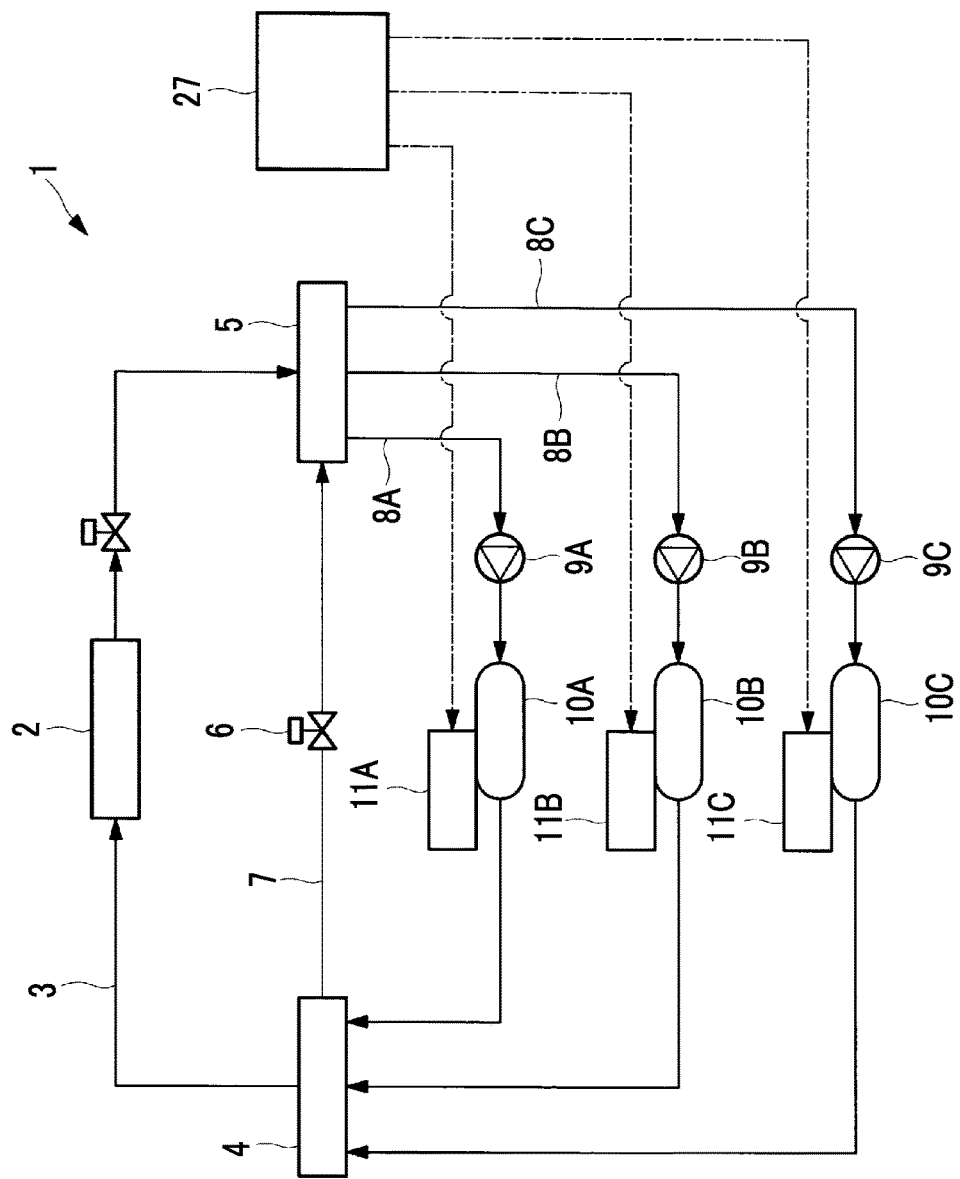
FIG. 1 is a diagram illustrating a schematic configuration of a heat pump system according to a first embodiment of the invention.
Figure 2:
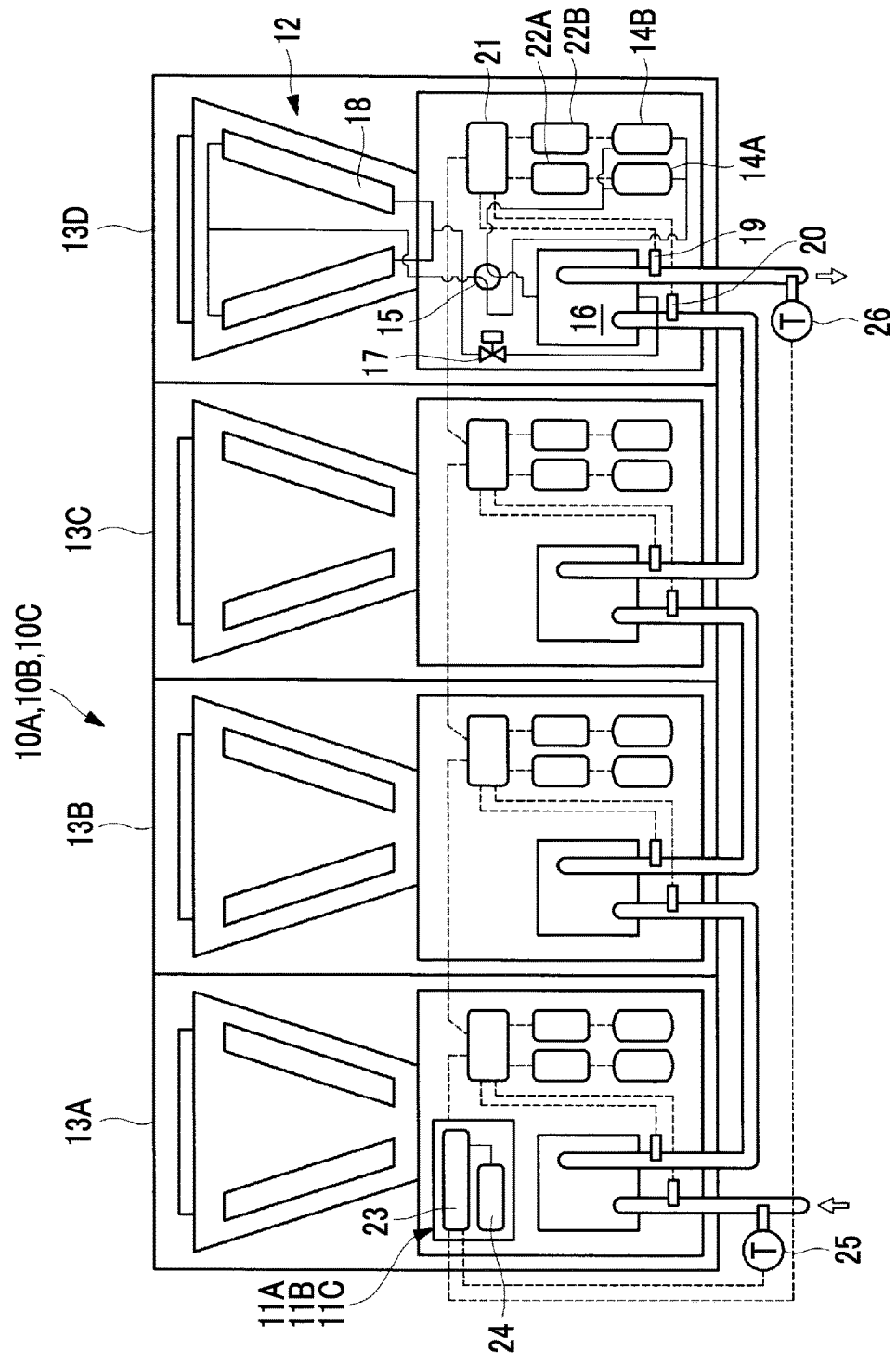
FIG. 2 is a diagram illustrating a configuration of respective units of the heat pump system.

FIG. 1 is a diagram illustrating a schematic configuration of a heat pump system according to the first embodiment of the invention, and FIG. 2 is a diagram illustrating a configuration of respective units thereof.

A heat pump system 1 includes a heat medium pipe 3 that circulates a heat medium (herein, hot water or cold water) with respect to an external load (hereinafter, referred to a system load) 2 such as an air conditioning device such as a fan coil unit, a water heater, or a factory facility. A supply header 4 is provided on a supply side of the heat medium pipe 3, and a return header 5 is provided on a return side.

A bypass pipe 7 provided with a bypass valve 6 is connected between the return header 5 and the supply header 4, through which the heat medium is able to bypass to the return header 5 from the supply header 4. Further, plural heat pumps 10A, 10B, and 10C are connected in parallel between the return header 5 and the supply header 4, through heat medium pipes 8A, 8B, and 8C, and heat medium pumps 9A, 9B, and 9C, respectively. Here, an example in which three heat pumps 10A, 10B, and 10C are connected in parallel, but the number of heat pumps may be increased or decreased according to the size or the like of the system load.

Hereinafter, in this embodiment, each of the heat pumps 10A, 10B, and 10C is referred to as a "unit". Each of the units 10A, 10B, and 10C may be configured by a single heat pump, or may be configured by serial connection of plural heat pumps. Further, in a case where the unit is configured by plural heat pumps, each heat pump is referred to as a "module", and the heat pump referred to as the module includes both of a modularized heat pump and a normal heat pump which is not modularized.

Unit controllers 11A, 11B, and 11C that individually control the respective units 10A, 10B, and 10C are provided in the respective units 10A, 10B, and 10C. Further, each of the units 10A, 10B, and 10C are configured by connecting plural individual heat pumps (here, heat pump chillers) 12 as modules 13A, 13B, 13C, and 13D in series. In this embodiment, an example in which four modules 13A to 13D are connected in series to form one unit 10A, 10B, or 10C is shown, but the number of modules is not limited thereto, and may be appropriately increased or decreased.

Hereinafter, a configuration of each heat pump chiller 12 that forms each of the modules 13A, 13B, 13C, and 13D will be described.

The heat pump chiller 12 includes a cooling cycle of a closed circuit configured by sequentially connecting plural compressors 14A and 14B which are connected in parallel, a four-way switching valve 15 that switches a flowing direction of a coolant, a water heat exchanger 16 that generates hot water or cold water, an expansion valve 17, and an air heat exchanger 18 that exchanges an external air and the coolant, through a coolant pipe. The heat pump chiller 12 may be a known heat pump chiller, and the heat pump chillers 12 having the same configuration may be used in the respective modules 13A to 13D. However, it is not essential that the heat pump chillers 12 have the same configuration.

Each heat pump chiller 12 includes a control system that includes a module substrate 21, inverter substrates 22A and 22B, and the like to control the number of revolutions or the like of the compressors 14A and 14B based on detection values of temperature sensors 19 and 20 which are respectively provided in a heat medium inlet port pipe and a heat medium outlet port pipe of the water heat exchanger 16, and has a modularized configuration.

In this embodiment, as shown in FIG. 2, each of the units 10A, 10B, and 10C has a configuration in which four modules 13A to 13D are connected in series with respect to the heat medium pipes 8A, 8B, and 8C, and in which the respective unit controllers 11A, 11B, and 11C each of which includes a general unit substrate 23 and an operating unit 24 that generally control four modules 13A to 13D are provided in one module 13A among the four modules 13A to 13D. Detection values from temperature sensors 25 and 26 provided in the heat medium inlet port pipe and the heat medium outlet port pipe with respect to the respective units 10A, 10B, and 10C are input to the respective unit controllers 11A, 11B, and 11C.

Further, a system controller 27 that controls the number of units which are in operation among the plural units 10A, 10B, and 10C which are connected in parallel with respect to a system load 2 is provided in the heat pump system 1. The system controller 27 regularly calculates a thermal load (flow rate×come-and-go temperature difference×specific weight•specific heat) Q of the system load 2 and a capacity C capable of being output by units which are in operation among the units 10A, 10B, and 10C, and compares the thermal load Q with the capacity C based on the calculation results to perform a control for increasing or decreasing the number of units which are in operation among the units 10A, 10B, and 10C.

Hereinafter, the control for increasing or decreasing the number of units which are in operation among the units 10A, 10B, and 10C using the system controller 27 will be described in detail with reference to FIGS. 3 and 4.

Figure 3:
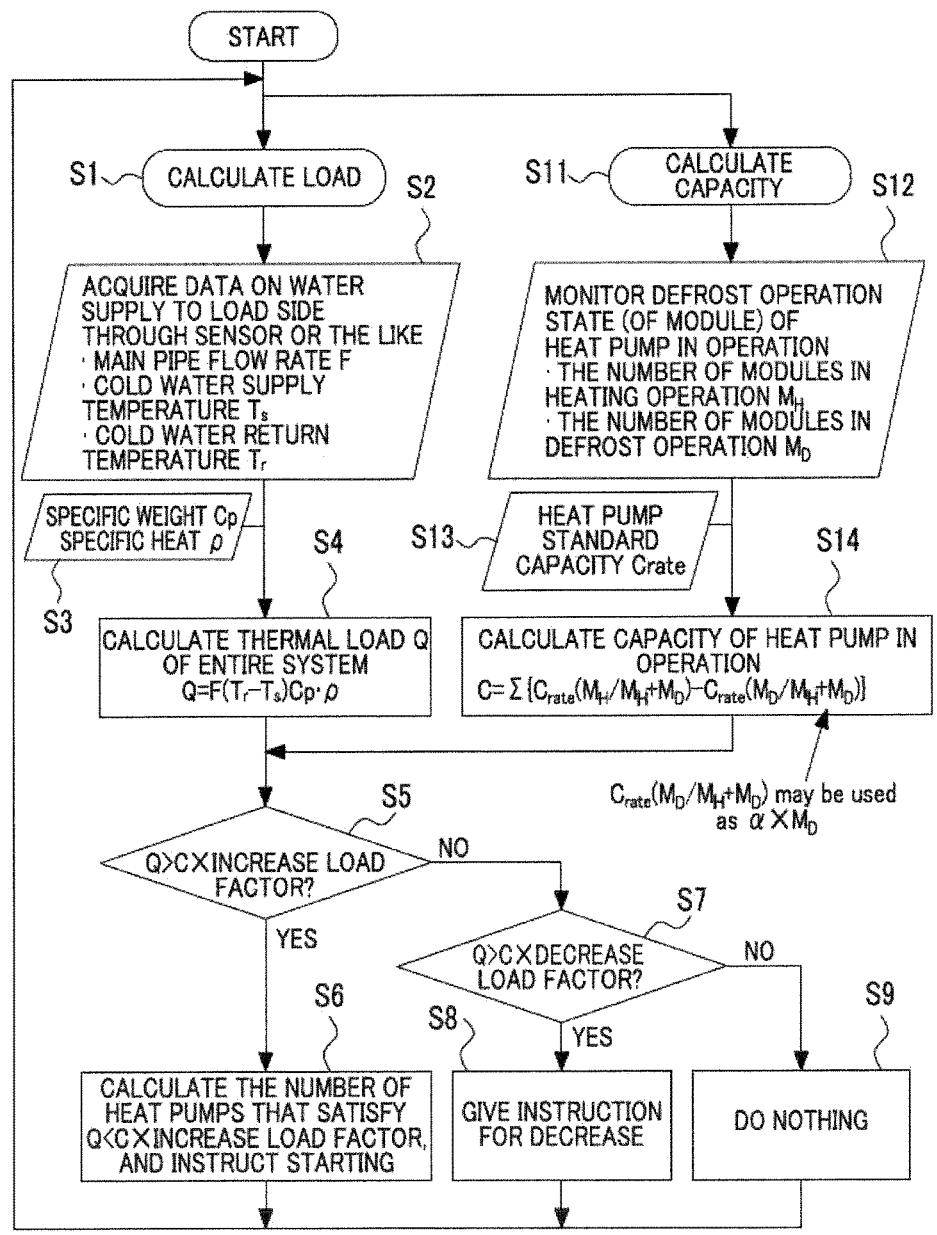
FIG. 3 is a flowchart when controlling the number of units which are in operation among the respective units of the heat pump system.
Figure 4:
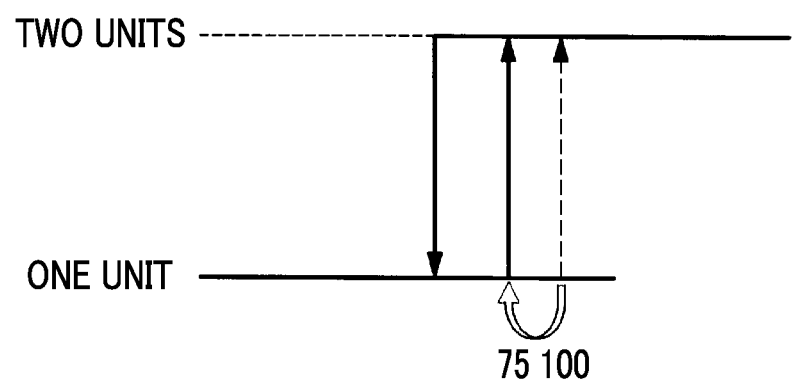
FIG. 4 is an image diagram of a control threshold value when increasing or decreasing the number of units which are in operation among the respective units of the heat pump system.

FIG. 3 shows a control flowchart when increasing or decreasing the number of units which are in operation, and FIG. 4 shows an image diagram of a control threshold value thereof.

If a control is started, in step S1 and step S11, calculation of the thermal load Q of the system load 2 and the capacity C capable of being output by units which are in operation among the units 10A, 10B, and 10C is regularly executed. The thermal load Q of the system load 2 may be obtained by acquiring a main pipe flow rate F, a cold water supply temperature Ts, a cold water return temperature Tr, and the like which correspond to data on water supply to a load side in step S2 through the respective sensors, receiving data such as a specific weight Cp and a specific heat ρ which are set in advance in step S3, and performing calculation using the following Expression (1) in step S4.

$$Q=F(Tr-Ts)Cp\cdot\rho \quad (1)$$

On the other hand, the capacity C capable of being output by units which are in operation among the units 10A, 10B, and 10C may be obtained by acquiring defrost state monitoring data of each of the modules 13A to 13D of each unit which is in operation among the units 10A, 10B, and 10C as the number of modules in a heating operation $M_H$ and the number of modules in a defrost operation $M_D$ in step S12, receiving a standard capacity Crate of each module (heat pump) which is set in advance in step S13, and performing calculation using the following Expression (2) in step S14.

$$C=\Sigma\{\text{Crate}(M_H/M_H+M_D)\text{Crate}(M_D/M_H+M_D)\} \quad (2)$$

Here, the $\text{Crate}(M_D/M_H+M_D)$ may be replaced with $\alpha \times M_D$.

Here, in a case where the air heat exchanger 18 of a specific module among of four modules 13A to 13D that form each of the units 10A, 10B, and 10C becomes frosted, since a defrost operation should be performed to remove frost and a heating operation of a module corresponding thereto should be stopped, it is necessary that the capacity C capable of being output by each unit which is in operation for heating among the units 10A, 10B, and 10C is calculated except for the capacity of the stopped unit. For example, when the capacity of each of the units 10A, 10B, and 10C is 100 kW, in a case where one unit includes four modules as described above, if one module becomes frosted and starts a defrost operation, the capacity C capable of being output by each unit becomes 100 kW×(¾)=75 kW.

The thermal load Q of the system load 2 calculated as described above is compared with the capacity C capable of being output by units which are in operation among the units 10A to 10C in step S5, and accordingly, the number of units which are in operation among the units 10A to 10C is increased or decreased. That is, in this embodiment, a configuration in which the capacity C capable of being output by units which are in operation among the units 10A to 10C is successively calculated and a value of the calculated capacity C is used as a threshold value in performing a control for increasing or decreasing the number of units which are in operation is used. In this case, as shown in FIG. 4, originally, when the thermal load Q exceeds 100 kW which is the capacity C capable of being output, the number of units which are in operation among the units 10A to 10C is increased, but since one module is under a defrost operation and the capacity C capable of being output becomes 75 kW, the number of units which are in operation among the units 10A to 10C is increased using 75 kW as a threshold value.

In this way, in step S5, it is determined whether the thermal load Q of the system load 2 exceeds the capacity C capable of being output. In a case where the determination is YES, the procedure proceeds to step S6 to give an instruction for increasing the number of units which are in operation among the units 10A to 10C by one. In this embodiment, when the thermal load Q is compared with the capacity C capable of being output to perform a control for increasing or decreasing the number of units which are in operation among the units 10A to 10C, a value obtained by multiplying the capacity C capable of being output by an increase load factor or a decrease load factor is used.

With respect to the increase load factor and the decrease load factor, a load factor range where a coefficient of performance (COP) of each of the units 10A to 10C is equal to or greater than a predetermined value is set in advance, and in a case where a load factor regulated in a relationship between the capacity of the units 10A to 10C and a demand thermal load exceeds the increase load factor defined as an upper limit value of the load factor range, the number of units which are in operation among the units 10A to 10C is increased. Further, in a case where the load factor exceeds the decrease load factor defined as a lower limit value of the load factor range, the number of units which are in operation among the units 10A to 10C is decreased. In this way, by increasing or decreasing the number of units which are in operation among the units 10A to 10C, it is possible to operate each of the units 10A to 10C at a COP which is constantly equal to or greater than the predetermined value.

Thus, in step S5, "Q>C×increase load factor" is determined. In a case where the thermal load Q exceeds the "C×increase load factor", in step S6, the number of units that satisfy "Q<C×increase load factor" is calculated to give an instruction for increasing the number of units which are in operation. Further, if the determination in step S5 is NO, the procedure proceeds to step S7 to determine "Q>C×decrease load factor". In a case where the thermal load Q exceeds the "C×decrease load factor", the procedure proceeds to step S8 to give an instruction for decreasing the number of units which are in operation among the units 10A to 10C. If the determination in step S7 is NO, the procedure proceeds to step S9 to return to a start position without any operation (without increasing or decreasing the number of units which are in operation).

In this embodiment, an example in which the capacity C capable of being output by units which are in operation among the units 10A to 10C is calculated by the system controller 27 is shown, but a system in which the capacity C capable of being output by units which are in operation among the units 10A to 10C is calculated by each of the controller 11A to 11C of the units 10A to 10C and the calculation result is transmitted to the system controller 27 to determine the increase or decrease of the number of units which are in operation may be used. In this case, the functions shown in steps S11 to S14 in FIG. 4 are performed by the controllers 11A to 11C of the units 10A to 10C.

Thus, according to the above-described heat pump system 1, it is possible to manufacture cold water or hot water by operating an appropriate number of units among the units 10A to 10C, and to circulate the cold water or hot water in the system load 2 for use. Here, in the system controller 27 or the unit controllers 11A to 11C, the thermal load Q of the system load 2 and the capacity C capable of being output by units which are in operation among the units 10A to 10C are regularly calculated, and the thermal load Q is compared with the capacity C capable of being output. Then, the number of units which are in operation among the units 10A to 10C is controlled to be increased or decreased, and thus, the heat pump system 1 is operated with a capacity corresponding to the thermal load Q of the system load 2.

That is, in this embodiment, since the system controller 27 that successively calculates the capacity C capable of being output by the units 10A to 10C, compares a value of the calculated capacity C which serves as a threshold value with the thermal load Q of the system load 2, and controls the number of units which are in operation among the units 10A to 10C is provided, even if any one of the modules 13A to 13D in each of the units 10A to 10C starts a defrost operation, the system controller 27 can compare the value of the calculated capacity C capable of being output by each of the units 10A to 10C with the thermal load Q of the system load 2, and can control the number of units which are in operation among the units 10A to 10C. Here, if there are modules 13A to 13D capable of providing a heating capacity in a specific unit among the units 10A to 10C, it is possible to operate the heat pump system 1 with a capacity corresponding to the system load 2 without directly performing an additional operation of another unit among the units 10A to 10C.

Accordingly, even when any one of the modules 13A to 13D in a specific unit among the units 10A to 10C performs a defrost operation, it is possible to prevent an additional operation of another unit among the units 10A to 10C according to conditions, and thus, it is possible to operate the heat pump system 1 using a minimum number of units with high accuracy, to thereby achieve energy saving. Further, it is possible to reduce the frequency of turning on and off of the units 10A to 10C, and thus, it is possible to prevent failure or trouble due to frequent repetition of the turning on and off, to thereby enhance reliability of the heat pump system 1.

Further, when comparing the thermal load Q of the system load 2 with the capacity C capable of being output by units which are in operation among the units 10A to 10C and performing a control for increasing or decreasing the number of units which are in operation among the units 10A to 10C, since it is determined whether the thermal load Q of the system load 2 exceeds a value obtained by multiplying the capacity C capable of being output which is a threshold value by an increase load factor or a decrease load factor, it is possible to operate each of the units 10A to 10C at a performance of coefficient (COP) which is constantly equal to or greater than a predetermined value. Accordingly, it is possible to constantly and stably operate the heat pump system 1 with high efficiency at a high COP, regardless of a change in the number of units which are in operation.

Furthermore, when calculating the capacity C capable of being output by units which are in operation among the units 10A to 10C, the calculation is performed by increasing or decreasing, when a specific module among the modules 13A to 13D in each of the units 10A to 10C starts or terminates a defrost operation, the capacity by a capacity of the specific module among the modules 13A to 13D. Thus, even if any one of the modules 13A to 13D starts or terminates a defrost operation so that the capacity C capable of being output is increased or decreased, it is possible to regularly calculate an capacity capable of being output with accuracy in consideration of the increased or decreased result. Accordingly, it is possible to correctly set the number of units which are in operation with respect to the thermal load Q of the system load 2 for operation, regardless of the presence or absence of a defrost operation in each of the modules 13A to 13D, and to reliably prevent a capacity shortage or the like.

Further, in this embodiment, since the capacity C capable of being output by each of the units 10A to 10C is configured to be calculated by either of the respective unit controllers 11A to 11C or the system controller 27, even in a case where the respective unit controllers 11A to 11C do not have a capacity calculation function, it is possible to provide a capacity calculation function to the system controller 27. Thus, even when a specific module among the modules 13A to 13D performs a defrost operation, it is possible to operate the heat pump system 1 with high efficiency using a minimum number of units corresponding to the thermal load Q of the system load 2 without performing an additional operation of the remaining units of the units 10A to 10C according to conditions. Thus, it is possible to simply apply the invention to an existing heat pump system.

Other Embodiments

Next, other embodiments of the invention will be described.

Example 1

In the above-described first embodiment, a configuration in which, when a specific module among the plural modules 13A to 13D that form each of the units 10A to 10C starts a defrost operation or terminates the defrost operation, the capacity C capable of being output is calculated to be increased or decreased by a capacity of the specific module among the modules 13A to 13D is used. However, in the heat pump, if a specific module among the modules 13A to 13D starts a defrost operation during a warming operation, since the water heat exchanger 16 which is a user side heat exchanger functions as an evaporator, the specific module among the modules 13A to 13D takes heat from a load side.

In this example, the capacity C capable of being output is calculated in consideration of such a phenomenon.

That is, in the specific module among the modules 13A to 13D which is under the defrost operation, the capacity C capable of being output becomes zero, and further, the taken heat acts as a negative capacity. Thus, as described above, in a case where one unit includes four modules, if one module becomes frosted and starts a defrost operation, the capacity C capable of being output of each unit becomes "100 kW×(¾)−100 kW×(¼)=50 kW". Further, three modules become frosted and start a defrost operation, the capacity C capable of being output of each unit becomes "100 kW×(¼)−100 kW×(¾)=−50 kW". Since the capacity of any one of the units 10A to 10C becomes a negative capacity, it may be considered that the number of units to be added for operation is 1 or 2.

In this way, by calculating the capacity C capable of being output by the units 10A to 10C by decreasing the capacity C by a capacity of a specific module among the modules 13A to 13D which is under a defrost operation from the capacity C and by considering, as a negative capacity, heat taken when the user side heat exchanger of the specific module among the modules 13A to 13D which is under the defrost operation functions as an evaporator, it is possible to calculate the capacity C capable of being output with high accuracy. Thus, it is possible to correctly set the number of units which are to be operated with respect to the thermal load Q of the system load 2 for operation, to thereby reliably prevent a capacity shortage or the like.

Example 2

Further, as a specific module among the modules 13A to 13D in the units 10A to 10C starts a defrost operation, it may be considered that another module among the modules 13A to 13D becomes also frosted and is operating in a state in which it readily undergoes the defrost operation. In such a case, there is a concern that another module among the modules 13A to 13D also starts the defrost operation. In order to prevent this problem, when calculating the capacity C capable of being output, an allowance rate (for example, 0.9) may be set for multiplication with the capacity C capable of being output so that a thermal load is not applied to the units 10A to 10C. Thus, it is possible to prevent frosting, and to prevent another module among the modules 13A to 13D from starting a defrost operation.

In this case, in a case where one unit includes four modules, when one module is under a defrost operation, the capacity C capable of being output by each of the units 10A to 10C may be calculated as follows.

$$100 \text{ kW} \times (3/4) \times 0.9 = 67.5 \text{ kW or}$$

$$100 \text{ kW} \times (3/4) \times 0.9 - 100 \text{ kW} \times (1/4) = 42.5 \text{ kW}$$

In this way, in a case where it may be considered that another module among the modules 13A to 13D is operating in a state in which it readily undergoes a defrost operation, by calculating the capacity C capable of being output through multiplication by a preset allowance rate so that a thermal load is not applied to the units 10A to 10C, it is possible to prevent frosting, and to prevent another module among the modules 13A to 13D from starting a defrost operation. Thus, it is possible to reduce the frequency at which each of the modules 13A to 13D starts a defrost operation, or to delay a timing when each of the modules 13A to 13D starts the defrost operation, to thereby enhance the efficiency in the heating operation.

In the above description, the allowance rate is set as "for example, 0.9", but is not limited thereto, and may be appropriately changed. Further, the allowance rate may be changed according to the number of modules which are in the heating operation among the modules 13A to 13D.

Example 3

In Example 2, when calculating the capacity C capable of being output by the units 10A to 10C, the capacity C is multiplied by an allowance rate, so that another module among the modules 13A to 13D does not easily starts a defrost operation. However, it may be considered that the modules 13A to 13D in which a defrost operation is terminated do not normally become frosted. Thus, with respect to the modules 13A to 13D in which the defrost operation is terminated, in calculation of the capacity C capable of being output, the multiplication by the allowance rate may be released for a set time T from the time when the defrost operation is terminated.

That is, in the latter case of Example 2, in a case where one module is under a defrost operation and the time T does not elapse after another module terminates a defrost operation, the capacity C capable of being output may be calculated as follows.

$$100 \text{ kW} \times (2/4) \times 0.9 + 100 \text{ kW} \times (1/4) - 100 \text{ kW} \times (1/4) = 45 \text{ kW}$$

In this way, in a case where there is a module among the modules 13A to 13D in which a defrost operation is immediately terminated in the units 10A to 10C, when calculating the capacity C capable of being output, by releasing multiplication by the allowance rate with respect to the modules 13A to 13D for a set time set from the time when the defrost operation is terminated, it is possible to calculate the capacity C capable of being output which is closer to an actual capacity. Accordingly, it is possible to correctly calculate the capacity C capable of being output, and to appropriately set the number of units which are to be operated among the units 10A to 10C with respect to the thermal load Q of the system load 2 for operation.

Example 4

Further, when a period of time during which each of the units 10A to 10C or each of the modules 13A to 13D continues a heating operation becomes longer, frost is easily generated, and thus, another module among the modules 13A to 13D also easily starts a defrost operation. Thus, according to the period of time during which the heating operation continues, when the period of time becomes longer, an allowance rate may be decreased for multiplication. That is, a temporal concept is considered in setting of the allowance rate, and for example, whenever a time t elapse, the allowance rate is decreased by 10%.

In this case, in a case where one unit includes four modules, when one module is under a defrost operation, and when the defrost operation in the units 10A to 10C is continued for the time t, the capacity C capable of being output may be calculated as follows.

$$100 \text{ kW} \times (3/4) \times (1 - 0.1 \times t) - 100 \text{ kW} \times (1/4) = 50 \text{ kW}$$

In this way, by calculating the capacity C capable of being output through multiplication by the allowance rate which is gradually decreased according to the period of time during which the defrost operation continues, and by preventing frosting so that a thermal load is not applied to the units 10A to 10C, it is possible to prevent another module among the modules 13A to 13D from starting a defrost operation. Accordingly, it is possible to reduce the frequency at which each of the modules 13A to 13D starts a defrost operation, or to delay a timing when each of the modules 13A to 13D starts the defrost operation, to thereby enhance the efficiency in the heating operation.

Example 5

Further, even if a defrost operation is performed, frost may remain without being removed. In such a case, a module easily starts a defrost operation again. Thus, in the units 10A to 10C, the number of defrost operations in the modules 13A to 13D which are in operation may be counted, and an allowance rate may be gradually decreased for multiplication as the number of defrost operations becomes larger. That is, the allowance rate is decreased for multiplication according to the number of defrost operations, for example, by 10% per every defrosting operation, to thereby calculate the capacity C capable of being output.

In this case, in a case where one unit includes four modules, when one module starts a defrost operation and three modules which are continuously operated terminate a defrost operation two times, respectively, the capacity C capable of being output may be calculated as follows.

$$100 \text{ kW} \times (3/4) \times (1 - 0.1 \times 2) - 100 \text{ kW} \times (1/4) = 35 \text{ kW}$$

In this way, frost may remain without being removed during a defrost operation, and thus, a module may start the defrost operation again in a short time, so that the number of defrost operations may be increased. In this case, by calculating the number of defrost operations in the modules 13A to 13D during operation of the units, and by calculating the capacity C capable of being output through multiplication by an allowance rate which is gradually decreased according to the number of defrost operations, it is possible to prevent frosting so that a thermal load is not applied to the units 10A to 10C, and to prevent another module among the modules 13A to 13D from starting a defrosting operation. Accordingly, it is possible to reduce the frequency at which each of the modules 13A to 13D starts a defrost operation, or to delay a timing when each of the modules 13A to 13D starts the defrost operation, to thereby enhance the efficiency in the heating operation.

The invention is not limited to the above-described embodiments, and may include appropriate modifications in a range without departing from the spirit of the invention. For example, in the above-described embodiments, heat taken by each of the modules 13A to 13D in a defrost operation is considered to be equal to the capacity of each of the modules 13A to 13D, but may be given a different fixed value.

Furthermore, in the above-described embodiments, for ease of description, an example in which an individual heat pump is referred to as a module or one or plural modules which are connected with respect to a load are referred to as a unit is shown, but the invention may be applied to a heat pump system in which plural individual heat pumps are connected with respect to a load, or to a heat pump system in which plural heat pumps are handled as a unit and plural units are connected with respect to a load. In this case, the module or the unit may be respectively read as the heat pump, and the respective heat pumps may be modularized or may not be modularized, as described above.

REFERENCE SIGNS LIST

1 Heat pump system
2 System load (external load)
10A, 10B, 10C Unit (heat pump)
11A, 11B, 11C Unit controller
12 Heat pump (heat pump chiller)
13A, 13B, 13C, 13D Module (heat pump)
27 System controller

The invention claimed is:

1. A heat pump system in which a plurality of heat pumps is connected with respect to a system load, comprising:
a system controller that successively calculates a capacity capable of being output by each heat pump which is in operation among the heat pumps, compares a value of the calculated capacity which serves as a threshold value with a thermal load of the system load, and controls the number of heat pumps which are in operation among the heat pumps,
wherein the system controller is configured to calculate, when a specific heat pump among the respective heat pumps starts or terminates a defrost operation, the capacity capable of being output by each heat pump so that an overall capacity of the heat pump system is increased or decreased by the capacity of the specific heat pump.

2. The heat pump system according to claim 1,
wherein the capacity capable of being output by each heat pump is able to be calculated by either of each heat pump controller or the system controller.

3. The heat pump system according to claim 1,
wherein the system controller is configured to calculate the capacity capable of being output by each heat pump by considering heat taken by the specific heat pump which is under the defrost operation as a negative capacity.

4. The heat pump system according to claim 1,
wherein the system controller is configured to calculate, when a specific heat pump among the respective heat pumps starts a defrost operation, the capacity capable of being output by the heat pump which is in operation through multiplication by a predetermined allowance rate which is smaller than 1.0.

5. The heat pump system according to claim 4,
wherein the system controller is configured to release, with respect to the specific heat pump in which the defrost operation has terminated, the multiplication by the allowance rate with respect to the capacity capable of being output for a set time from the time when the defrost operation is terminated.

6. The heat pump system according to claim 4,
wherein the system controller is configured to perform the multiplication while gradually decreasing the allowance rate when a period of time during which each heat pump continues a heating operation becomes longer.

7. The heat pump system according to claim 4,
wherein the system controller is configured to count the number of times of the defrost operation of the heat pump which is in operation and to perform the multiplication while gradually reducing the allowance rate as the number of times of the defrost operation becomes larger.

8. An operation method of a heat pump system in which a plurality of heat pumps is connected with respect to a system load, comprising the steps of:
successively calculating a capacity capable of being output by each heat pump which is in operation among the heat pumps, and calculating, when a specific heat pump among the respective heat pumps starts or terminates a defrost operation, the capacity capable of being output by each heat pump so that an overall capacity of the heat pump system is increased or decreased by the capacity of the specific heat pump;
comparing a value of the calculated capacity which serves as a threshold value with a thermal load of the system load; and
controlling increasing or decreasing the number of heat pumps which are in operation among the heat pumps according to whether the thermal load of the system load exceeds the threshold value which is the value of the calculated capacity.

9. The operation method of the heat pump system according to claim 8,
wherein increase or decrease in the number of heat pumps which are in operation is determined according to whether the thermal load of the system load exceeds a value obtained by multiplying the threshold value which is the value of the calculated capacity by an increase load factor or a decrease load factor.

* * * * *